United States Patent [19]

Preradovich

[11] 4,027,488

[45] June 7, 1977

[54] SHAFT LINER ASSEMBLY

[76] Inventor: Radovan Preradovich, 191 Cadillac Avenue, Val d'Or, Quebec, Canada

[22] Filed: Feb. 4, 1975

[21] Appl. No.: 547,094

[30] Foreign Application Priority Data

Feb. 8, 1974 Canada .................. 192105

[52] U.S. Cl. ........................... 61/41 R; 52/245; 61/45 R
[51] Int. Cl.² .................................... E21D 5/06
[58] Field of Search .............. 61/45 R, 42, 84, 41, 61/41 A, 39; 52/82, 249, 245

[56] References Cited

UNITED STATES PATENTS

| | | | |
|---|---|---|---|
| 953,827 | 4/1910 | Haas | 52/82 X |
| 1,572,197 | 2/1926 | Ferguson | 61/45 R X |
| 1,670,625 | 5/1928 | Johannesson | 61/45 R |
| 1,814,852 | 7/1931 | Proctor | 61/45 R X |
| 1,867,837 | 7/1932 | Jackson | 61/45 R X |
| 1,975,043 | 9/1934 | Hoffmann | 61/45 R X |
| 2,077,137 | 4/1937 | Wilkoff | 61/45 R |
| 2,160,342 | 5/1939 | Ribble | 61/45 R |
| 2,388,624 | 11/1945 | Tashjian | 61/45 R X |
| 3,483,704 | 12/1969 | Tabor | 61/45 R |

*Primary Examiner*—Dennis L. Taylor
*Attorney, Agent, or Firm*—Cushman, Darby & Cushman

[57] ABSTRACT

A shaft liner assembly has a series of layers of arcuate segments, the segments in each layer forming a circle, and each side edge portion of each segment being outwardly reversely bent. A series of connecting brackets each have a longitudinally-extending base portion with wing portions extending from opposite sides thereof and inclined towards one another, each bracket being in sliding engagement with adjacent reversely bent portions of respective laterally adjacent segments in two vertically adjacent layers of segments. The wing portions of each connecting bracket are on the opposite side of the respective reversely bent portions of the segments to the base portion to secure laterally and verticaly adjacent segments together.

2 Claims, 5 Drawing Figures

SHAFT LINER ASSEMBLY

This invention relates to shaft liner assemblies.

It is an object of the invention to provide a shaft liner assembly which is simple in construction, easy to install in a shaft, reliable in operation, and easy to remove from a shaft.

According to the invention, a shaft liner assembly includes a series of layers of arcuate segments, the segments in each layer forming a circle, and each side edge of each segment being outwardly reversely bent. The shaft liner assembly also includes a series of connecting brackets, each bracket having a base portion with wing portions extending from opposite sides thereof and inclined towards one another. In a completed assembly, each bracket is in sliding engagement with adjacent reversely bent portions of respective laterally adjacent segments in two vertically adjacent layers of segments, with the wing portions of each connecting bracket being on the opposite side of the respective reversely bent portions of the segment to the base portion to secure laterally and vertically adjacent segments together.

Each segment may also have a lug projecting from one end and an apertured connecting member aligned with the lug adjacent the opposite end, with the lug of each segment being engaged in the apertured connecting member of a vertically adjacent segment.

One embodiment of the invention will now be described, by way of example, with reference to the accompanying drawings of which:

Figure 1:
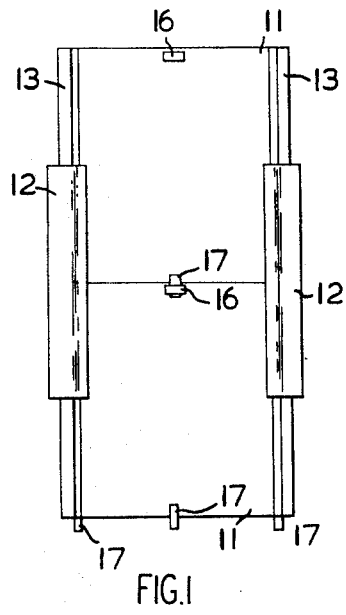
FIG. 1 is a side view of a manhole liner assembly.
Figure 2:
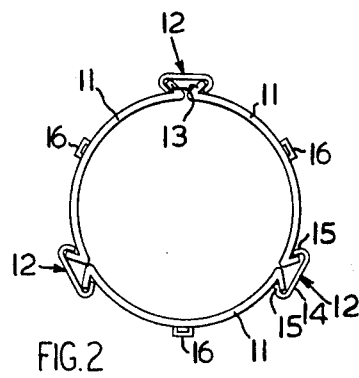
FIG. 2 is a plan view of the liner assembly.
Figure 4:
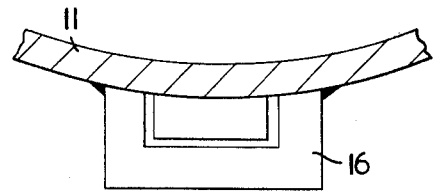
FIG. 4 is an enlarged plan view, partly in section, of an upper portion of a segment showing an apertured connecting member.
Figure 3:
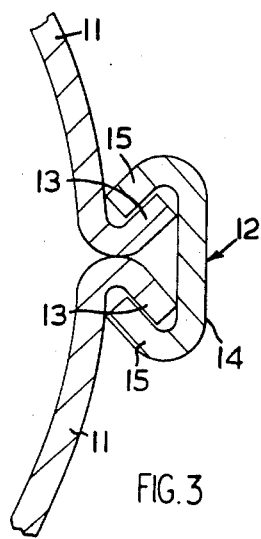
FIG. 3 is an enlarged sectional plan view of the connection between two laterally adjacent segments of the liner assembly.
Figure 5:
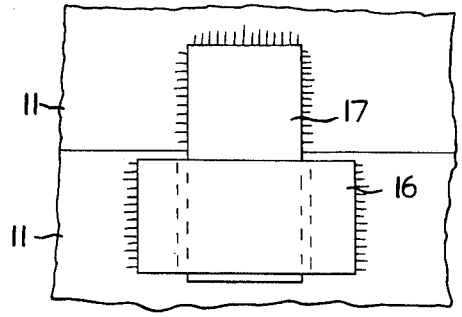
FIG. 5 is an enlarged side view of portions of vertically adjacent segments showing a connection therebetween.

Referring to the drawings, a shaft liner assembly intended for use in a manhole includes a series of arcuate metal segments 11 and a series of metal connecting brackets 12. Each segment 11 extends for one third of the circumference of a circle having the radius of the segments, so that three segments 11 can be assembled to form a circle. Alternatively of course, the circle could be made up of two or four segments.

Each side edge of each segment 11 has an outwardly reversely bent portion 13. Each connecting bracket 12 has a longitudinally extending base portion 14, with wing portions 15 extending from opposite sides of the base portion 14 and inclined towards one another. Each connecting bracket 12 is dimensioned so that it can be slid over laterally adjacent reversely bent portions 13 of adjacent segments 11 to hold the segments together.

Each segment 11 also has an apertured metal connecting member 16 welded adjacent its upper edge midway between its sides, and a downwardly projecting lug 17 welded adjacent its lower edge midway between its sides. Each lug 17 is consequently vertically aligned with an apertured connecting member 16.

To assemble the liner assembly in a manhole, three segments 11 are positioned in the manhole to form a circle, with their apertured connecting members 16 uppermost. Three connecting brackets 12 are then slid downwardly in turn over the respective junctions between the segments 11. The connecting brackets 12 are only slid part way down over the segments 11, so as to leave portions of the connecting brackets 12 projecting above the segments 11, which form a first layer.

A second layer of three segments 11 is then positioned, one segment at a time, on the first layer, so that each lug 17 of an upper segment 11 engages in the apertured connecting member 16 of the corresponding lower segment 11, and also so that the respective reversely bent portions 13 of the upper segments 11 engage in the respective connecting brackets 12 projecting upwardly from the first layer. Thus, each connecting bracket 12 extends over two vertically adjacent layers of segments 11.

Of course, as many layers as are necessary can be built up in this way. It will be seen that a secure effective structure is provided by the segments 11 and the connecting brackets 12, which not only connect laterally adjacent segments 11 but also extend over two layers of segments and also by the cooperation of the connecting lugs 17 and apertured connecting members 16 of adjacent layers of segments 11. It will also be noted that all of the assembly operations can easily be made by longitudinal movement of the various parts, thereby enabling the assembly to be easily installed in a shaft, such as a manhole, by movement of the parts along the shaft. Removal of the liner assembly from a shaft is also of course readily achieved in a similar manner.

The embodiments of the invention in which an exclusive property or privilege is claimed are defined as follows:

1. A shaft liner assembly for a manhole adapted for easy assembly and disassembly on site in the ground for retaining when assembled the ground thereabout, said assembly comprising a plurality of vertically adjacent layers of arcuate segments, said segments in each layer forming a circle, each segment having two horizontally disposed arcuate edge portions, one edge portion defining the top edge of said segment and the other defining the bottom edge thereof with the top edges of the segments in a lower one of said layers being in juxtaposition with the bottom edges of the segments in a layer which is vertically adjacent thereto, each segment further having two vertically disposed substantially straight side edges, each vertically disposed side edge being outwardly reversely bent, and a series of connecting brackets, each bracket having a longitudinally extending base portion with wing portions extending from opposite sides thereof and inclined toward one another, each bracket being in vertical sliding engagement with adjacent reversely bent portions of respective laterally adjacent segments in two vertically adjacent layers of segments, the wing portions of each connecting bracket being on the opposite side of the respective reversely bent portions of the segments to the base portion to secure both laterally and vertically adjacent segments together.

2. The shaft liner assembly of claim 1 wherein each segment has a lug projecting from one of said horizontally disposed arcuate side edges thereof and an aperture connecting member aligned with said lug adjacent the opposite end thereof, the lug of each segment being engaged in the apertured connecting member of a vertically adjacent segment.

* * * * *